Nov. 30, 1937. L. LÖWENSTEIN Re. 20,563
METHOD OF PACKING ACID SULPHATES AND THE LIKE COMPOUNDS
Original Filed June 29, 1934
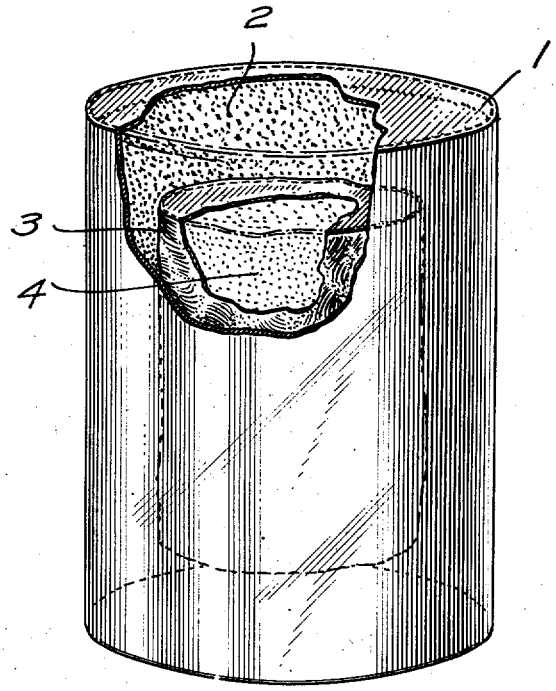
INVENTOR.
LEO LÖWENSTEIN,
BY
H. C. Bierman
ATTORNEY.

Reissued Nov. 30, 1937

Re. 20,563

UNITED STATES PATENT OFFICE 20,563

METHOD OF PACKING ACID SULPHATES AND THE LIKE COMPOUNDS

Leo Löwenstein, Berlin-Wilmersdorf, Germany

Original No. 2,020,072, dated November 5, 1935, Serial No. 733,129, June 29, 1934. Application for reissue February 18, 1937, Serial No. 126,319½. In Germany September 1, 1930

5 Claims. (Cl. 23—240)

This invention relates to the packing of compounds having an acid reaction and capable of destroying the ordinary packing material, and more particularly to a method of packing acid sulphates, such as bisulphates, and the like compounds.

Hitherto, for packing said compounds, as a rule, lead sheet, sheet metal covered with lead, ceramic material and other packing material being resistant to the action of concentrated sulphuric acid, has been used. For the usual packing materials of animal and vegetable origin cannot be used for this purpose since they are more or less rapidly destroyed by the action of the concentrated sulphuric acid which is liberated from the bisulphate or the like compounds on access of moist, not-dried air.

Difficulties of a special kind arise when small quantities of bisulphates and the like compounds in the form of small lumps are to be packed so that they can be safely handled by inexperienced persons. Thus in the German patent specifications Nos. 198,866 and 205,138, for instance bothersome methods for storing and using bisulphate in handy quantities are disclosed. According to these patents, the bisulphate is cast into blocks which latter are paraffined. The blocks consequently do not have a very high rate of solution so that in cases where their rapid dissolution is necessary, as in the extinction of fires and the preparing of baths, they cannot always be used successfully.

Now, it has been found that it is possible to pack bisulphate and the like compounds even in the state of small lumps or powder, in any desired quantities in containers of regenerated cellulose or cellulose reaction products, paper, fabric or similar utilizable packing materials of vegetable or animal origin. All such materials are used in the form of a flexible bag or like container. Broadly, the above identified materials may be defined as organic sheet packing materials.

Dry bisulphate, for instance, is filled into a container made of one of the said substances, such as a paper bag, the container is closed in the usual manner by creasing and then introduced into a second container, for instance into a larger bag, box or the like of any desired material, filled with so much soda or sodium bicarbonate that the latter encloses the bisulphate bag in a continuous layer. This layer of bicarbonate surrounding the bisulphate packing is continuously maintained by the pressure exerted downwardly and laterally by the bisulphate bag owing to its weight. Although the inner wrapping gradually becomes brittle this is no drawback; for in the meantime the contact surfaces of the two salts will have reached a stable state owing to the internal pressure and no further mixing will take place.

The flexibility of these packages makes them particularly adapted for carbonic acid evolution since it is possible to accelerate the gas current by pressing. They are particularly of use where hitherto expensive organic acids or acid salts thereof have had to be used in place of bisulphate for technical and medicinal purposes merely for the reason that the packing difficulties which arise when using bisulphate could not be overcome.

In the accompanying drawing constituting a part hereof, the single figure is an elevational view of a package made in accordance with my invention, some parts being broken away for clearness.

There is provided an outer container 1 of any suitable shape and material capable of holding salts. Within the same is a salt 2 capable of evolving $CO_2$, such as alkali metal bicarbonate. An inner container 3 of paper or other cellulosic material is filled with an acid salt 4, such as alkali metal acid sulphate. The salt 2 completely encloses the paper container 3.

A particularly advantageous form of packing from a technical point of view has a water-tight material for the outer wrapping or casing, such as impregnated paper or fabric, metal and so forth. If water is allowed to flow into the package after opening the wrapping at the end intended therefore, then carbonic acid is evolved immediately. The carbonic acid is caused to evolve at the place of the fire when the package is to be used as a fire extinguishing device. The package may also be taken into the bath and even into open waters if it is to be used for evolving carbonic acid for medicinal purposes. While in the above mentioned cases of application the fact that one may use and obtain only water-soluble compounds, represents an advantage of this method, in the latter case, i. e. when using the package for evolving carbonic acid for bathing purposes, also aluminum sulfate and the like compounds may be used although they form an insoluble residue on decomposition.

This method of packing is particularly suitable in cases where streams of foam containing carbonic acid are to be produced as for instance for extinguishing fires and for preparing foam baths in the known manner. For this purpose saponin or some other foam-producing agent is mixed with the bicarbonate.

It is a known disadvantage that carbonic acid baths that the acid liberated above the bath is harmful to the bathers. This disadvantage can be obviated by using persulphate instead of bisulphate. A still stronger admixture of oxygen is produced if percarbonate is used as outer layer. These substances act on the packing like bisulphate and bicarbonate.

Of course, many variations and changes in the described method may be made by those skilled in the art in accordance with the principles set forth herein and in the claims annexed hereto.

What I claim is:

1. A durable package of sulphates having an acid reaction and being capable of destroying the ordinary cellulosic packing material comprising an outer container having an alkali metal carbonic acid salt capable of reacting with said sulphate, an inner container of said cellulosic material, sub-divided acid sulphate in said inner container and completely surrounded thereby, said inner container being completely surrounded by said carbonic acid salt.

2. A durable package of sulphates having an acid reaction and being capable of destroying the ordinary cellulosic packing material comprising an outer container having an alkali metal bicarbonate capable of reacting with said sulphate, an inner container of paper, sub-divided acid sulphate in said inner container and completely surrounded thereby, said inner container being completely surrounded by said bicarbonate.

3. A durable package of sulphates having an acid reaction and being capable of destroying the ordinary cellulosic packing material comprising an outer container having an alkali metal carbonic acid salt capable of reacting with said sulphate, an inner container of organic sheet packing material of such character as to be destroyed by sulphuric acid evolved by the reaction of said acid sulphate with water, sub-divided acid sulphate in said inner container and completely surrounded thereby, said inner container being completely surrounded by said carbonic acid salt.

4. A durable package of sulphates having an acid reaction and being capable of destroying the ordinary cellulosic packing material comprising an outer container having an alkali metal carbonic acid salt capable of reacting with said sulphate, an inner container of flexible organic sheet packing material of such character as to be destroyed by sulphuric acid evolved by the reaction of said acid sulphate with water, sub-divided acid sulphate in said inner container and completely surrounded thereby, said inner container being completely surrounded by said carbonic acid salt.

5. A durable package of sulphates having an acid reaction and being capable of destroying the ordinary cellulosic packing material comprising an outer container having an alkali metal carbonic acid salt capable of reacting with said sulphate, an inner container of organic sheet packing material of such character as to be destroyed by sulphuric acid evolved by the reaction of said acid sulphate with water, sub-divided acid sulphate in said inner container and completely surrounded thereby, said inner container being substantially completely surrounded by said salt.

LEO LÖWENSTEIN.